United States Patent
Benachenou et al.

(10) Patent No.: US 7,416,667 B2
(45) Date of Patent: Aug. 26, 2008

(54) POLYURETHANE OIL DE-EMULSIFICATION UNIT

(75) Inventors: Amine Benachenou, Montreal (CA); Jean-Pierre Parent, Montreal (CA)

(73) Assignee: ProSep Inc., Montreal (CA)

( * ) Notice: Subject to any disclaimer, the term of this patent is extended or adjusted under 35 U.S.C. 154(b) by 315 days.

(21) Appl. No.: 10/363,028

(22) PCT Filed: Sep. 7, 2001

(86) PCT No.: PCT/CA01/01284

§ 371 (c)(1),
(2), (4) Date: Aug. 5, 2003

(87) PCT Pub. No.: WO02/20115

PCT Pub. Date: Mar. 14, 2002

(65) Prior Publication Data

US 2004/0112823 A1 Jun. 17, 2004

(30) Foreign Application Priority Data

Sep. 7, 2000 (CA) .................................. 0022013

(51) Int. Cl.
- *B01D 24/00* (2006.01)
- *B01D 17/022* (2006.01)
- *B01D 17/04* (2006.01)

(52) U.S. Cl. .................. 210/285; 210/286; 210/290; 210/799; 210/DIG. 5; 210/807

(58) Field of Classification Search ................ 210/285, 210/502.1, DIG. 5, 799
See application file for complete search history.

(56) References Cited

U.S. PATENT DOCUMENTS

| | | | | |
|---|---|---|---|---|
| 1,756,862 A | * | 4/1930 | Holford | ............ 210/109 |
| 2,985,589 A | * | 5/1961 | Broughton et al. | ........ 210/676 |
| 3,016,345 A | * | 1/1962 | Price | ............ 208/187 |
| 3,231,091 A | * | 1/1966 | Kingsbury et al. | ........ 210/335 |
| 3,503,514 A | | 3/1970 | Lawson | |
| 3,583,904 A | | 6/1971 | Winston et al. | |
| 3,645,398 A | * | 2/1972 | Fiocco | ............ 516/137 |
| 3,651,944 A | * | 3/1972 | Shuttleworth | ........ 210/265 |
| 3,674,684 A | * | 7/1972 | Gollan | ............ 210/675 |

(Continued)

FOREIGN PATENT DOCUMENTS

CA          1059921          8/1979

(Continued)

*Primary Examiner*—Robert James Popovics (57) ABSTRACT

A process for separating an aqueous emulsion including an aqueous phase and an non-aqueous phase into separated aqueous and non-aqueous phases, to provide a recovered non-aqueous phase, and to provide a recovered aqueous phase containing an acceptable level of the non-aqueous phase. In the process, at least one body, and preferably two or more bodies, of polymeric material with a high surface area, typically a foam material or polymer chips, is used in a horizontal flow treatment system to break the emulsion and thus provide both the aqueous and non-aqueous phases as two separate flows. A wide range of polymers can be used in the system as the polymeric material including polyurethane, polypropylene, polystyrene, polyester, and polyethylene. If a very low level of non-aqueous phase in the effluent is required, for example to meet potable water standards, then a Kozlowski polyurethane, as described in U.S. Pat. No. 5,239,040, is preferred as the last polymeric material body.

10 Claims, 7 Drawing Sheets

U.S. PATENT DOCUMENTS

| Number | | Date | Inventor | Class |
|---|---|---|---|---|
| 3,721,069 A | * | 3/1973 | Walker | 55/319 |
| 3,738,492 A | | 6/1973 | Trillich | |
| 3,779,908 A | * | 12/1973 | Gregory | 210/799 |
| 3,797,666 A | | 3/1974 | Nakanishi et al. | |
| 3,844,743 A | * | 10/1974 | Jones | 96/184 |
| 3,847,821 A | * | 11/1974 | Krueger | 210/488 |
| 3,852,193 A | * | 12/1974 | Jakubek et al. | 210/744 |
| 3,862,963 A | * | 1/1975 | Hoshi et al. | 502/402 |
| 3,865,732 A | * | 2/1975 | Terhune et al. | 210/315 |
| 3,925,202 A | * | 12/1975 | Hirs | 210/795 |
| 3,946,039 A | * | 3/1976 | Walz | 264/628 |
| 3,951,814 A | * | 4/1976 | Krueger | 210/488 |
| 3,957,647 A | * | 5/1976 | Jones | 210/265 |
| 4,022,694 A | | 5/1977 | Fruman | |
| 4,039,489 A | * | 8/1977 | Fletcher et al. | 521/63 |
| 4,061,573 A | | 12/1977 | Biron | |
| 4,115,266 A | | 9/1978 | Ohshima | |
| 4,162,973 A | * | 7/1979 | Lynch | 210/744 |
| 4,199,447 A | * | 4/1980 | Chambers et al. | 210/638 |
| 4,213,863 A | * | 7/1980 | Anderson | 210/108 |
| 4,220,544 A | * | 9/1980 | McGrew | 210/526 |
| 4,226,722 A | * | 10/1980 | Jones | 210/287 |
| 4,356,090 A | * | 10/1982 | Tran | 210/350 |
| 4,624,765 A | * | 11/1986 | Cerkanowicz et al. | 204/563 |
| 4,744,889 A | * | 5/1988 | Kruyer | 209/9 |
| 4,870,151 A | | 9/1989 | Scholl et al. | |
| 5,023,002 A | * | 6/1991 | Schweizer et al. | 210/710 |
| 5,196,117 A | | 3/1993 | Billiett et al. | |
| 5,229,015 A | * | 7/1993 | Keep et al. | 210/799 |
| 5,239,040 A | | 8/1993 | Kozlowski | |
| 5,331,079 A | | 7/1994 | Kozlowski | |
| 5,336,802 A | | 8/1994 | Smith et al. | |
| 5,531,890 A | * | 7/1996 | Keenan | 210/242.4 |
| 5,549,823 A | * | 8/1996 | Hirs | 210/265 |
| 5,603,825 A | * | 2/1997 | Costinel | 210/109 |
| 5,688,075 A | | 11/1997 | Gradek | |
| 5,730,872 A | * | 3/1998 | Rhodes | 210/519 |
| 6,447,685 B1 | * | 9/2002 | Saal et al. | 210/662 |
| 7,021,471 B2 | * | 4/2006 | Abrams | 210/519 |
| 7,033,496 B2 | * | 4/2006 | Thacker et al. | 210/305 |
| 7,303,085 B2 | * | 12/2007 | Lindsey et al. | 210/521 |
| 2004/0112823 A1 | * | 6/2004 | Benachenou et al. | 210/285 |
| 2006/0163177 A1 | * | 7/2006 | Johnson et al. | 210/799 |
| 2006/0231510 A1 | * | 10/2006 | Benachenhou | 210/799 |

FOREIGN PATENT DOCUMENTS

| | | | |
|---|---|---|---|
| CA | 2057425 | | 6/1992 |
| CA | 2085951 | | 7/1993 |
| CA | 2109467 | | 4/1995 |
| CA | 2175088 | | 5/1995 |
| DE | 33 37 655 A1 | | 4/1985 |
| EP | 0 702 991 A1 | | 3/1996 |
| GB | 1 372 936 | | 11/1974 |
| GB | 1 418 806 | | 12/1975 |
| GB | 1 440 976 | | 6/1976 |
| GB | 1 517 715 | | 7/1978 |
| GB | 1564932 | | 4/1980 |
| GB | 2083370 | * | 3/1982 |
| GB | 2 260 765 A | | 4/1993 |
| JP | 49005865 | | 1/1974 |
| JP | 49047966 | | 5/1974 |
| JP | 53-42450 | | 4/1978 |
| JP | 53-98155 | | 8/1978 |
| JP | 57038284 | | 3/1982 |
| JP | 60232212 | | 11/1985 |
| JP | 5123864 | | 5/1993 |
| JP | 08-252418 | | 10/1996 |
| RU | 2 104 736 | | 2/1998 |
| SU | 1242197 | | 7/1986 |
| WO | WO 94/21347 | | 9/1994 |
| WO | WO 94/21862 | | 9/1994 |
| WO | WO 95/12036 | | 5/1995 |

* cited by examiner

POLYURETHANE OIL DE-EMULSIFICATION UNIT

In the recent past, there have been several well documented instances of the inadvertent spillage of liquids causing both environmental, ecological, and even toxicological problems for plant species, insects, wild life, and even people. Examples of spilled liquids include oils and solvents, and a group of materials known loosely as PCB's. For many of these liquids, methods of clean up are known, even for relatively difficult ones, such as crude oil and PCB's.

For many of these materials, a feasible method of both clean up and recovery is described by Kozlowski, in U.S. Pat. No. 5,239,040. This method has been shown to be both practical, and effective, in that rather than simply dispersing the spilled liquid with, for example, a detergent, the spilled liquid itself is recovered. It is then possible to separate the recovered liquid from the recovery agent so that the recovered liquid can be safely dealt with in an appropriate fashion, and so that the recovery agent itself an be re-used to capture more liquid. As described by Kozlowski, the recovery agent and the recovered liquid are separated by centrifugation. The recovery agent described Kozlowski is a polyurethane foam material, which is prepared from specified reactants using a particular process. Hereafter this material will be described as "Kozlowski polyurethane foam".

In addition to its ability to function as a re-useable liquid recovery agent, Kozlowski polyurethane has been shown to be useable to recover, for example, oil which has been spilled onto water. The Kozlowski polyurethane has been shown to be able to absorb, for example, oil not only when the foam is essentially dry but also when the foam is essentially fully wet or even waterlogged.

Another difficulty with spilt non-aqueous liquids arises when water is present. A water immiscible liquid can be present in association with water in two quite different forms. At least a part of it will generally be present as a discrete second phase, which may be heavier or lighter than water. The remainder will generally be present as an emulsion, of at least some level of stability, and in which water can be either the continuous phase or the disperse phase. In both cases, there is also the difficulty that nearly all substances that appear to be immiscible with water, for example light hydrocarbons such as benzene, in fact are soluble in water to a small extent, often at a level of parts per million. For an aqueous emulsion in which water is the continuous phase, Kozlowski, in WO 94/21347, disclosed that in addition to absorbing oil droplets dispersed as a second phase in water, Kozlowski polyurethane, even when water logged, will also absorb dissolved oil down to the low levels required for potable water.

In WO 94/21347 Kozlowski describes a water treatment procedure in which the tainted water is allowed to flow downwardly through successive layers of Kozlowski polyurethane. The outflow of water has to be monitored, and the foam layers removed to recover absorbed oil from them when the oil level in the outflow water rises to an unacceptable value.

Although the procedure described by Kozlowski in WO 94/21347 appears to deal with aqueous emulsions, in practise it has several disadvantages, the most relevant one being that all of the oil, both as disperse phase and as solute, has to be absorbed by the Kozlowski polyurethane, recovered from it typically by centrifugation, and the Kozlowski polyurethane re-used to recover more oil. It is thus apparent that treating a large volume of water containing only relatively small amounts of emulsified oil can become very time consuming. There is therefore a need for an alternative technique to the use of Kozlowski polyurethane, as described in WO 94/21347, at least as a primary treatment for dealing with aqueous emulsions.

The only other apparently viable alternative for dealing with emulsions is to flocculate the droplets until a size is reached at which separation into two phases will occur. This will generally require flocculation to a droplet size in excess of at least 30 μm. However, this technique requires the consumption of chemicals and the creation of a chemical sludge. It is consequently not environmentally friendly in use.

This invention seeks to overcome these difficulties, and to provide a treatment apparatus and process which will deal with aqueous emulsions reasonably quickly, and which will provide the non-aqueous phase in a recoverable form.

This invention is based on the discovery that not only Kozlowski polyurethane foam, but also other polymeric materials when fabricated into a body of high surface area material such as a foam, if used under the correct conditions, will function as an emulsion breaker, and will separate a flow of an aqueous emulsion into two separate phases. Such conditions include adjusting the flow rate of incoming aqueous emulsion so that there is an adequate contact time between the aqueous emulsion and the polymeric material to effect separation of the non-aqueous phase, and to form a free floating non-aqueous phase layer. It has been found that when several polymeric materials when fabricated into a body of high surface area material are exposed, for example, to a flow of an emulsion of oil and water containing up to at least about 10,000 ppm dispersed oil, two processes appear to take place. First, the polymeric material absorbs oil before and until it becomes saturated with oil. Second, as the polymeric material continues to absorb more oil, it releases as much oil as it absorbs, but it does so at a droplet size which is sufficiently large to coalesce into a separate oil phase. It is then possible to separate the aqueous and non-aqueous phases, and recover each of the two phases separately. Further, by the use of a plurality of treatment steps, the majority of the emulsified non-aqueous material can be recovered on a continuous basis, so that a Kozlowski polyurethane foam absorbent only may be necessary for the last, or for the last few, treatment steps in the sequence. The only significant restrictions on the polymer material appear to be first the ability to form a high surface area material, such as a foam, from it, and second that the polymeric material chosen is resistant to degradation under the conditions of use; for example, a polyester material is not suitable under alkaline conditions which will result in hydrolytic degradation of the polymer, but which would be resisted by a polyalkylene such as polyethylene.

Thus in its broadest embodiment, this invention seeks to provide a process for separating an aqueous emulsion having a continuous aqueous phase and an non-aqueous disperse phase into separated aqueous and non-aqueous phases, to provide a recovered non-aqueous phase, and to provide a recovered aqueous phase containing an acceptable level of the non-aqueous phase, which process comprises:

(a) contacting the flow of an aqueous emulsion with a first body of polymeric material having a high surface area;

(b) continuing the flow of aqueous emulsion until a separate non-aqueous phase is formed;

(c) adjusting the flow rate of the aqueous emulsion so that there is an adequate contact time between the aqueous emulsion and the polymeric material effecting a continuous separation of the non-aqueous phase and to form a free floating non-aqueous phase layer;

(d) separating the separated non-aqueous phase obtained in steps (b) and (c) without stopping the flow of aqueous emulsion;

(e) recovering the separated non-aqueous phase obtained in step (d) without stopping the flow of aqueous emulsion;
(f) recovering a flow of treated aqueous phase without stopping the flow of aqueous emulsion; and
(g) repeating steps (a) to (f) to contact the flow of treated aqueous phase with at least a second body of polymeric material having a high surface area until the maximum acceptable level of non-aqueous phase is reached in the flow of recovered aqueous phase.

Preferably, the polymer used in the polymeric material is chosen from the group consisting of polyurethane, polypropylene, polystyrene, polyester, and polyethylene. More preferably, the polymeric material is polyurethane.

Preferably, the polymer material having a high surface area is a polymeric foam material. More preferably, the polymer material having a high surface area is a particulate polymeric foam material. Alternatively, the polymer material having a high surface area is in the form of polymer chips.

Preferably, the flow of aqueous emulsion in step (a) contacts the first body of polymeric material in a flow direction chosen from the group consisting of horizontal, vertical downwardly, and vertical upwardly.

Preferably, a plurality of bodies polymeric material is used, the flow contacts each of them in sequence, and separated non-aqueous phase is recovered from the flow after the each body of polymeric material. Alternatively, a plurality of bodies polymeric material is used, the flow contacts each of them in sequence, and separated non-aqueous phase is recovered from the flow after the each body of polymeric material except for the last, and separated non-aqueous phase is recovered from the last body.

Preferably, when a sequence of bodies of polymeric materials is used, at least the last body of polymeric material comprises a Kozlowski polyurethane foam.

Preferably, the process further includes pretreatment steps prior to step (a) in which steps:
(h) non-aqueous phase droplets large enough to coalesce are allowed to form a separated non-aqueous phase,
(i) the separated non-aqueous phase is recovered, and
(j) the aqueous phase is recovered and used as the flow in step (a).

The invention will now be described by way of reference to the attached drawings in which.

Figure 1:
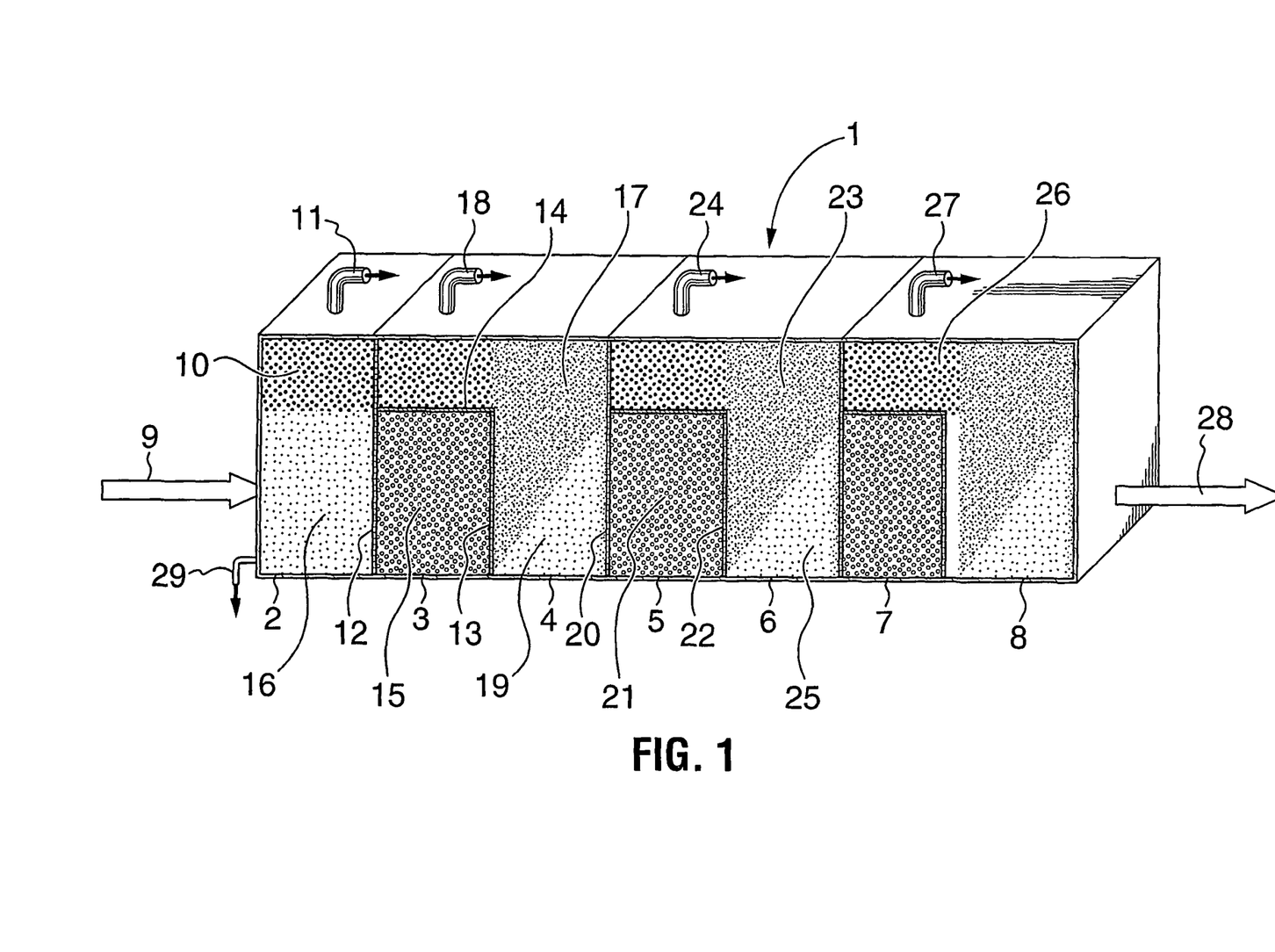
FIG. 1 shows schematically a three unit treatment system.

Referring first to FIG. 1, this shows schematically a three compartment unit together with a pre-treatment unit. The treatment system 1 comprises a set of boxes 2, 3, 4, 5, 6, 7 and 8. These can be fabricated as separate units, or they can be fabricated in pairs as shown, or as a single complete treatment system. A flow of incoming aqueous emulsion 9 enters box 2, which is a pretreatment unit. The emulsion flow 9 will enter this box typically at about one third to one half way up from the bottom. In this box, any large droplets coalesce into a separated non-aqueous phase 10, which is removed through the pipe 11.

The next box 3 has foraminous sidewalls 12 and 13, and a solid top sheet 14. The box is packed with high surface area polymeric material 15, which is typically a foam. The foam is normally used in a particulate form, in part to assist in packing the box, and in part to ensure the exposure of a high surface area to the flow through the box. A typical particle size is from about 5 mm to about 20 mm. The separated aqueous emulsion phase 16 from box 2 enters box 3 through the wall 12, contacts the polymeric material 15, and passes through wall 13 into box 4. In box 3, further separation of the non-aqueous and aqueous phases occurs. In box 4, the two phases separate to provide a second separated non-aqueous phase 17 which is recovered through the pipe 18, and a treated aqueous phase 19 passes to box 5. As shown, box 4 includes an enlarged optional catchment space extending over the top of box 3.

Boxes 5 and 6 are constructed in the same way as boxes 3 and 4. Treated aqueous phase 19 enters box 5 through the foraminous wall 20, contacts the polymeric material 21, and leaves through foraminous wall 22. In box 6 further non-aqueous phase 23 separates, is collected, and recovered through the pipe 24. Twice treated aqueous phase 25 passes to boxes 7 and 8, which again are the same as boxes 3 and 4, with a third body of polymeric material between two foraminous walls. In box 8 further non-aqueous phase 26 is collected and recovered through pipe 27, and a flow 28 of treated aqueous phase leaves the system from box 8. In each of pipes 18, 24 and 27 a suitable flow control device is used, such as a float operated automatic valve, or a time sequenced valve.

In the treatment system, the flow rate of incoming aqueous emulsion 9 is adjusted so that there is an adequate contact time between the aqueous emulsion and the polymeric material in boxes 3, 5 and 7 to effect separation of the non-aqueous phase, and to form a free floating non-aqueous phase layer. In practise, this is generally found to be sufficient to provide droplets having a size in excess of at least about 150 µm.

If the acceptable level of non-aqueous phase in the treated aqueous phase 28 is extremely low, for example if the treated aqueous phase is intended to meet the standards for potable water, then it is recommended that at least the third body of polymeric material in box 7 should be Kozlowski polyurethane foam. In that case, the Kozlowski polyurethane foam will be acting as an absorbent only, and not as an emulsion breaker. Consequently, when the third body—or the last if more than three are used—is a Kozlowski polyurethane foam functioning as only an absorbent, a separate non-aqueous phase will not be formed, and there will not be a non-aqueous phase flow in pipe 27. Instead, the treated aqueous phase has to be monitored, so that when the Kozlowski polyurethane foam becomes fully loaded with non-aqueous phase (which will be indicated by a rise in concentration in the treated flow 28) it is removed, and the non-aqueous phase recovered from it, typically by centrifugation. In order to avoid having to cease processing while non-aqueous phase is recovered from the loaded Kozlowski polyurethane, it is convenient to provide two treatment units in parallel, which are used alternately.

Similarly, if the incoming aqueous flow 9 is heavily contaminated with the non-aqueous phase, more than three polymeric material bodies may be required. The number required will be largely determined by the level of contamination which is acceptable in the effluent water from the treatment unit. If the incoming aqueous flow also contains solid material, it is advantageous to provide a vent 29 from box 2 so that accumulated solids can be periodically removed.

The polymeric material in the first compartment may also need to be inspected periodically, and replaced if it becomes clogged with suspended small particle size solids in the aqueous flow which have not been separated in a pretreatment stage.

This unit has the advantage that the non-aqueous phase droplets as they are detached from the body of polymeric material simply continue to rise away from it, and it is only the treated flow which moves laterally.

In FIG. 1 the flow of aqueous emulsion through the bodies of polyurethane material in treatment stages is essentially horizontal. It is also possible to arrange the treatment stages so that the flow passes through the polyurethane body essentially vertically, in either an upward or a downward direction. A suitable treatment unit is shown in FIG. 2 in which the flow passes in an upward direction.

Figure 2:
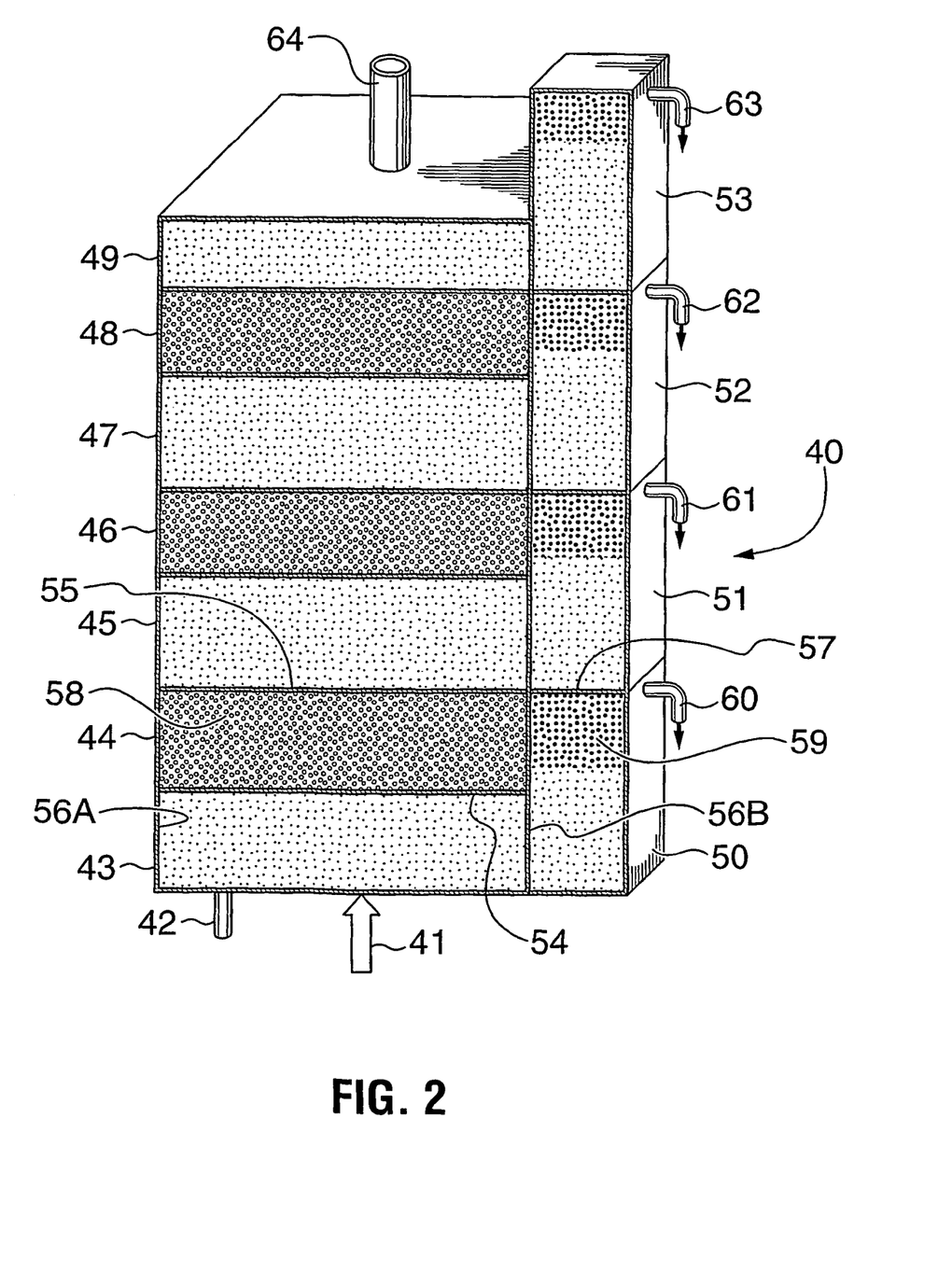
FIG. 2 shows schematically an alternative unit.

In FIG. 2 the treatment unit 40 as shown is essentially a single structure: like the horizontal unit it can be made as one integral structure or from several separate interconnected boxes. Aqueous emulsion enters the bottom of the unit through a pipe as at 41 into the first box 43. If desired, a drain 42 can be provided to deal with any solids that accumulate in box 43. The boxes then alternate upwardly: boxes 43, 45, 47 and 49 contain the aqueous phase flowing through the treatment unit, and boxes 44, 46 and 48 contain the high surface area polymeric material. Catchment boxes 50, 51, 52 and 53 are then located beside each pair of boxes. The construction and operation of boxes 43, 44 and 50 is exemplary. The polymeric material is located on a grid 54, such as a perforated metal plate, and between the outer solid wall 56A and inner wall 56B. The wall 56B includes a row of perforations or slots across the box 43 just below the grid 54. The top surface 57 of the catchment box 50 is solid. As the emulsion encounters the saturated body of polymeric material body 58, the aqueous phase continues more or less upwardly through it, and into the next box. If desired, a second perforated metal plate 55 can be located above the body of polymeric material 56. As the polymeric material breaks the emulsion, the separated oil droplets tend to collect on its lower surface, and tend not to percolate through it; the separated oil droplets travel sideways through the perforations or slots in wall 56B into the catchment box 50. Separated oil collects as a second phase as at 59, and is removed through the pipe 60. Flow through the pipe 60 is again controlled in any suitable way, for example a float controlled automatic valve or a time sequenced valve. The two following units operate in the same way, to provide a treated water flow into the following box above, and an oil flow in the pipes 61 and 62.

How the last box 49, together with its catchment box 53, operate depends on the amount of oil still in the aqueous emulsion flow reaching it, and the amount of oil that can be accepted in the effluent treated water flow 64. In order to separate any free oil in the incoming water a suitable wire arrangement is provided between the box 49 and the catchment box 53. If the last body of polymeric material in box 48 is Kozlowski polyurethane foam that is functioning only as an absorbent, then there should be no separated oil flow into the catchment box 53, and hence no oil flow in the pipe 63. In the alternative, if the last body of polymeric material in box 48 is functioning to separate further oil, then it is possible that there can be some oil droplets in the water in box 49. These are then trapped in the catchment box 53, and recovered as an oil phase through pipe 63.

As described, the treatment unit in FIG. 2 includes three polyurethane bodies. How many bodies are used will be determined by essentially three factors: the quantity of emulsion to be treated, the amount of non-aqueous material in the emulsion, and the quality level required in the outflow of treated water. It is therefore possible the more than the three units shown will be required in some cases. Since units of this type are often required to be used either under adverse conditions, or under conditions where only minimal supervision is possible, it is preferred that the number of treatment units used should be more than analyses indicate to be required, thus providing a safety margin.

Figure 3:
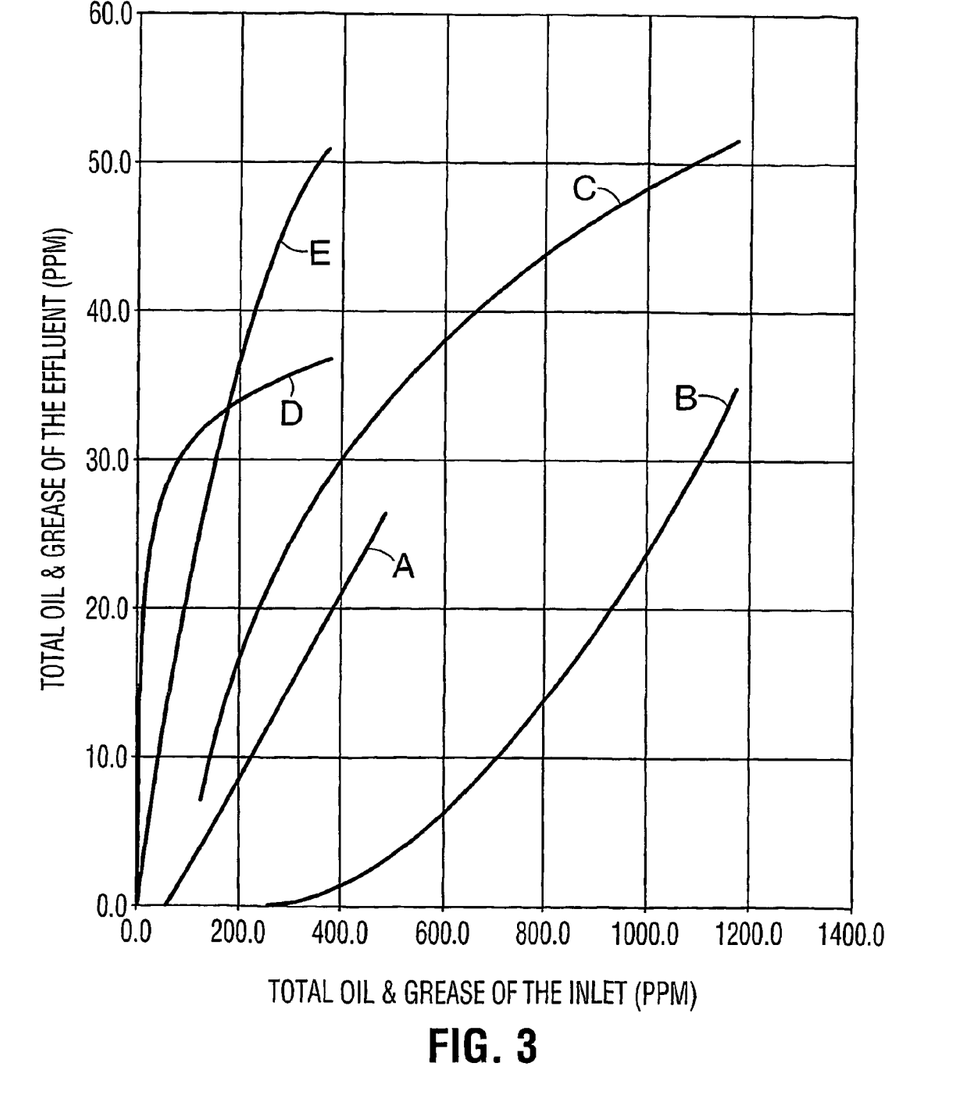
FIG. 3 shows graphically the performance of Kozlowski polyurethane and four other commercially available polyurethane materials.
Figure 4:
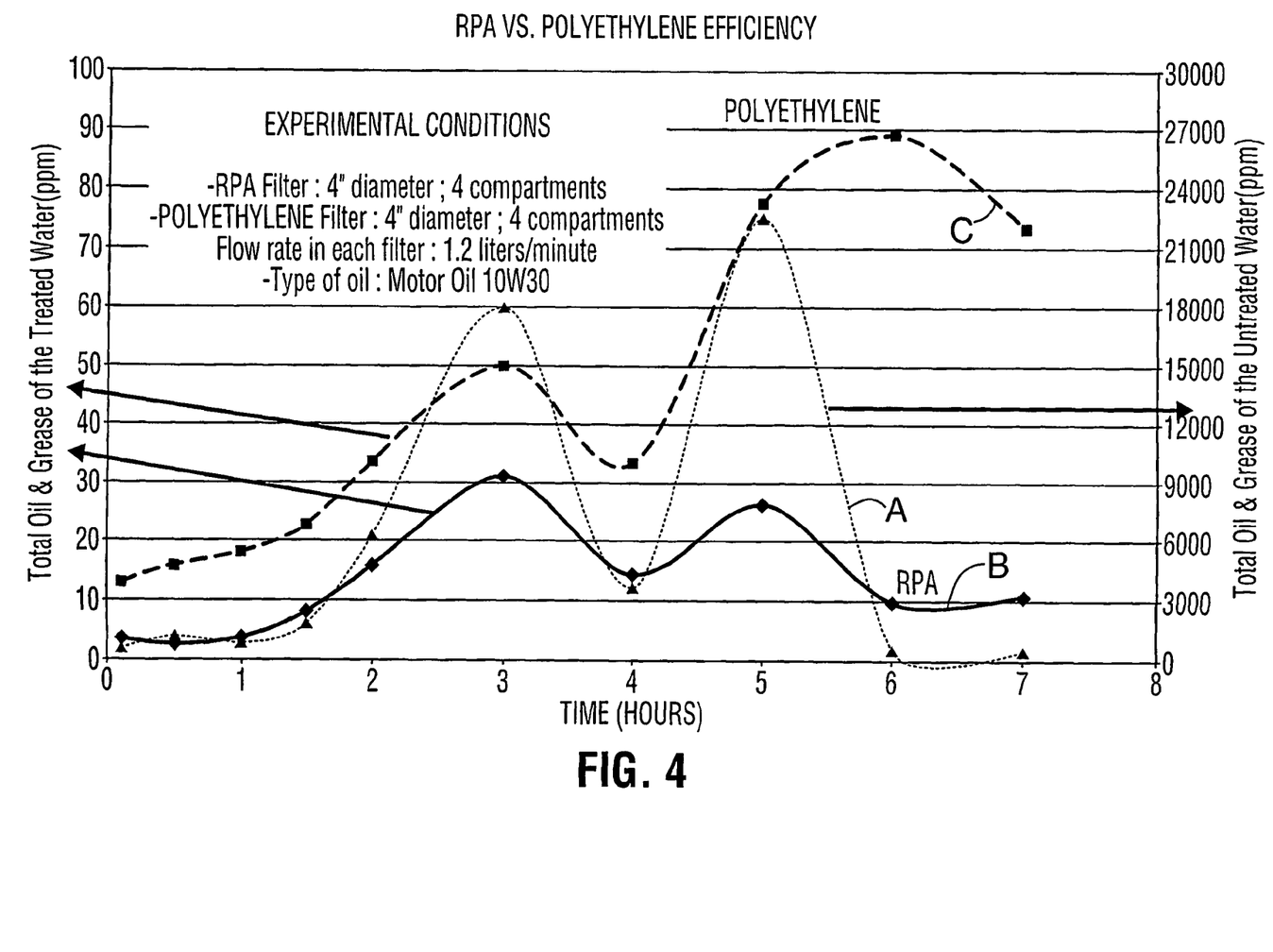
FIGS. 4, 5, 6 and 7 show graphically the performance of foams of polyurethane, polypropylene, polystyrene, polyester, and polyethylene.
Figure 5:
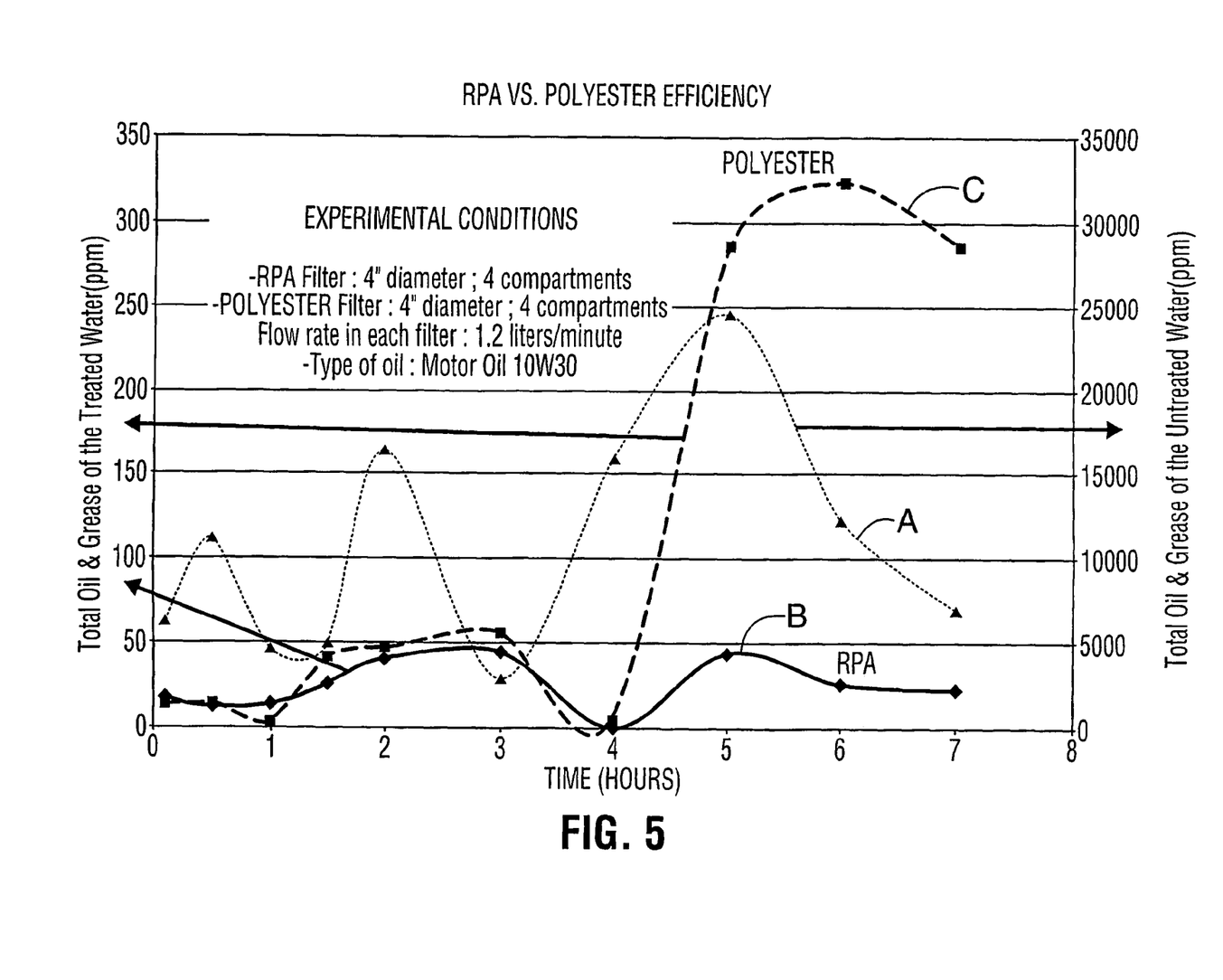
Figure 6:
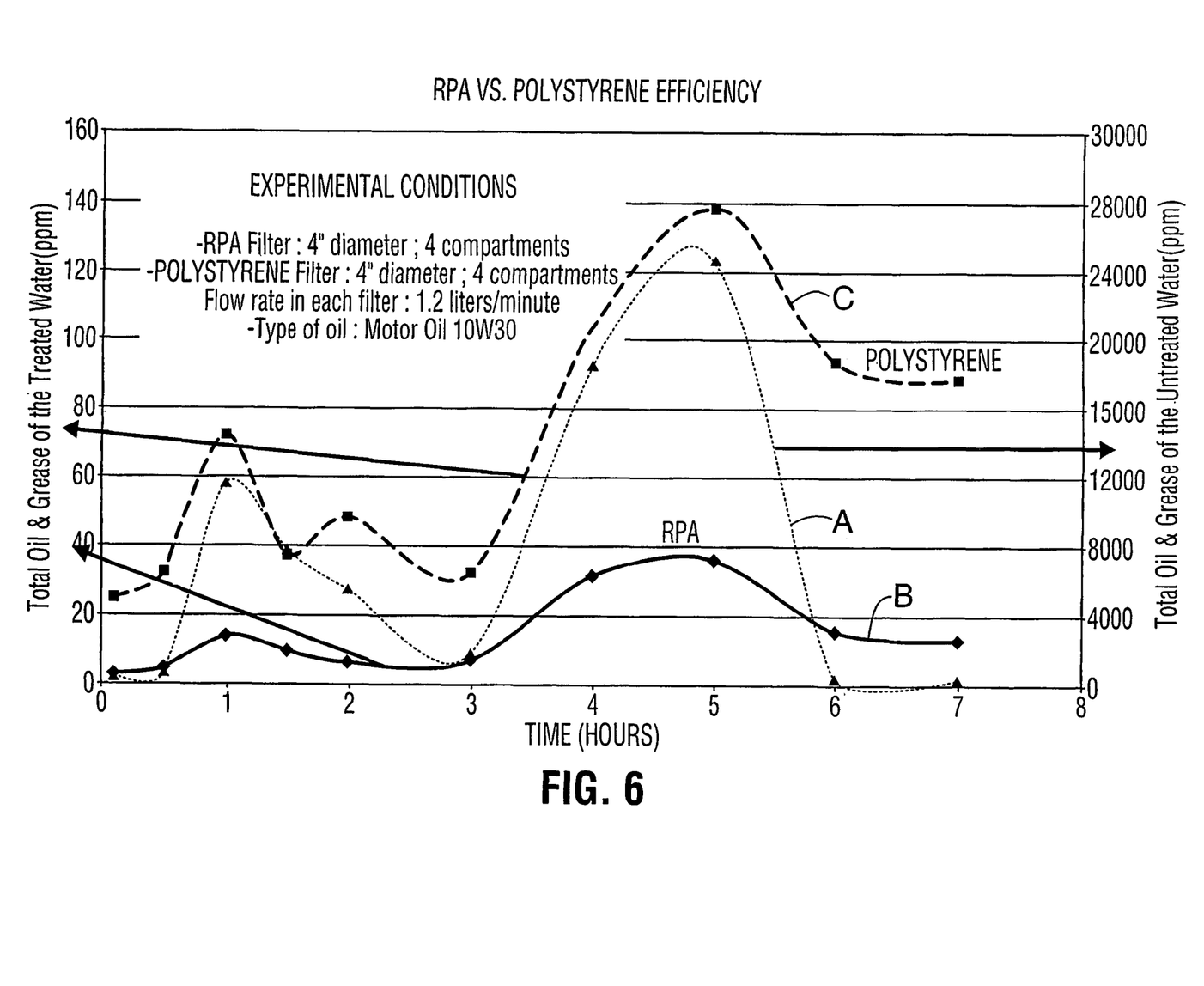
Figure 7:
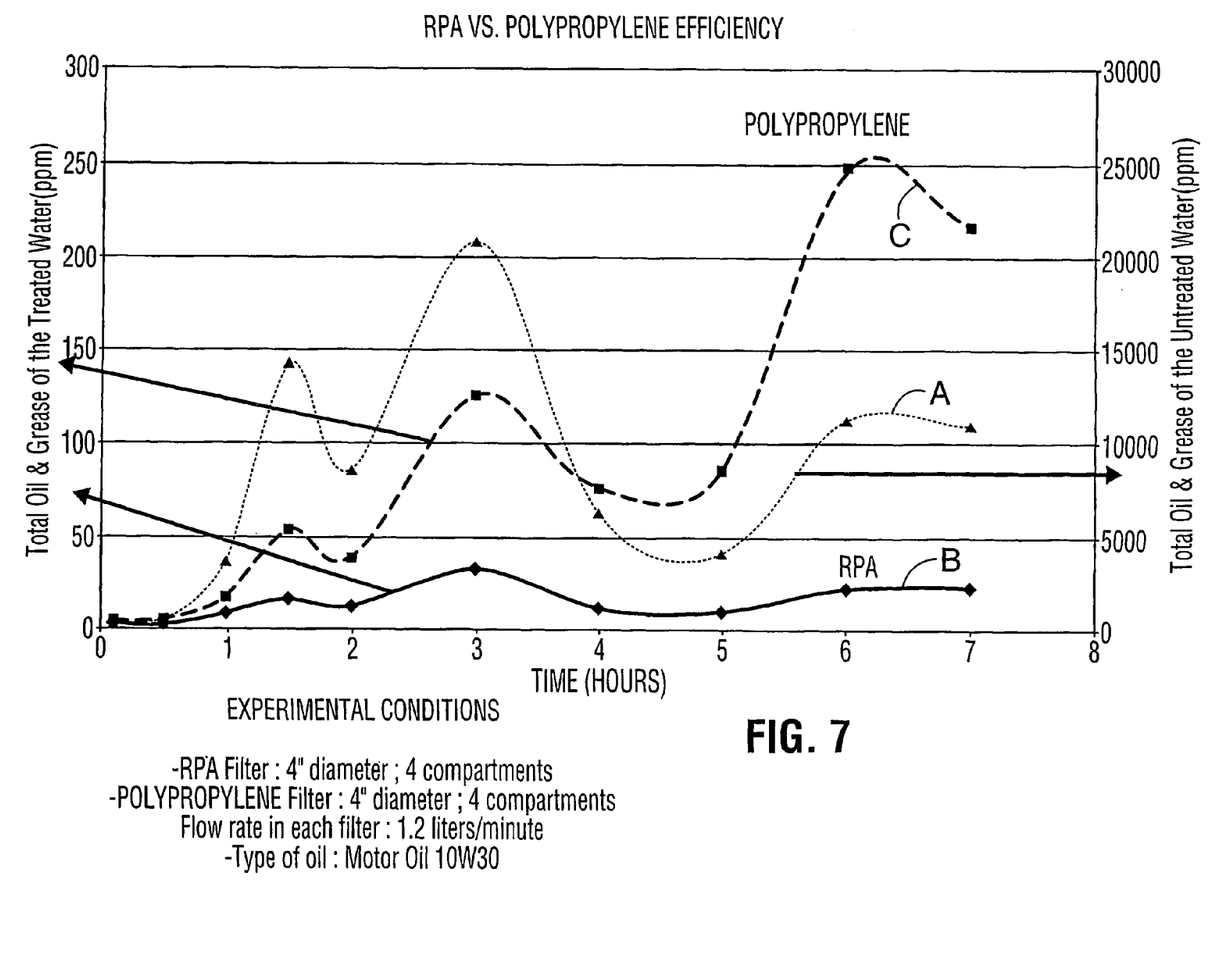

In the practise of this invention, as noted above, if a very low level of non-aqueous material in the aqueous phase is required it is usually desirable to use a Kozlowski polyurethane in at least the last treatment stage. For the earlier stage, or stages, other polymeric materials can be used. FIG. 3 shows comparative performance data for five different polyurethane materials. This data is based on a single pass test, in which an aqueous oil emulsion was passed through a body of each foam material, and the oil content at both inlet and outlet was determined. In these tests, a 10 cm diameter pipe was used containing five compartments. The second and fourth compartment, each about 4 cm in length contained the test sample of polyurethane. The first, third and fifth compartment were empty, and about 0.8 cm in length. The flow through the test pipe was horizontal. The emulsion used was 10W30 motor oil mixed into water using a centrifugal pump at 3,450 rpm. The flow rate was constant, at 1.5 L/min.

In FIG. 3, the effluent oil level (vertical axis) is plotted against the inlet oil level (horizontal axis), in ppm on both axes.

The five polyurethane materials are identified as follows.
A: Kozlowski polyurethane foam.
B: Upholstery grade foam chips, composition unknown.
C: Great Stuff™ polyurethane foam.
D: Great Stuff™ expanding polyurethane foam.
E: All Direction Great Stuff™ polyurethane foam.

Product B is a standard commercial product available from many sources; its composition is not known. The product was supplied by Eversoft Fibre and Foam Ltd. Products C, D and E are all commercially available, and are made by Flexible Products Co., Joliet, Ill., USA. The main components appear to be 4,4'-diphenylmethanediisocyante, a polyether/polyol blend, and a blowing agent. As FIG. 3 shows, all of these products are capable of significantly reducing the oil content of the oil and water system tested.

FIGS. 4, 5, 6 and 7 the results of similar test are shown using other polymeric materials, with a polyurethane foam included for comparison. In these tests, the cylinder contained four compartments packed with the polymeric material, the flow rate was 1.2 liters/minute, and the test oil in the emulsion was 10W30 motor oil. The test polymers used were:
in FIG. 4, polyethylene;
in FIG. 5, polyester;
in FIG. 6, polystyrene; and
in FIG. 7, polypropylene.

The polyester and polyurethane were used as foams; the polyethylene, polystyrene and polypropylene were used as high surface area small particles, which were thin cutting chips(similar to swarf) with a maximum dimension of about 5 mm. In each experiment, the mixture of oil and water was passed through the cylinder, and the oil level measured before and after treatment. The oil level in the aqueous flow was not constant.

In each of FIGS. 4-7 the horizontal axis is time in hours; and the vertical axes are in parts per million(ppm). The left axis refers to the treated aqueous flow, and the right axis to the untreated aqueous flow; these axes are not to the same scale. In each Figure, trace A is the incoming aqueous oil containing flow; trace B is after treatment with polyurethane, and trace C is after treatment with the test polymer. In each Figure the traces show that the amount of oil left in the aqueous flow is related to the amount of oil present initially. These traces also show that of the materials tested, the polyurethane appears to be the most effective, and reduces the oil level to generally less than a maximum of about 50 ppm.

The invention claimed is:

1. An apparatus for continuously separating a flow of an aqueous emulsion including an aqueous continuous phase and a non-aqueous disperse phase to provide a flow comprising a non-aqueous phase and a further flow comprising a recovered aqueous phase containing an acceptable level of non-aqueous phase, which apparatus comprises in combination at least a first compartment and a second compartment wherein:
(a) the first compartment includes
a first feed means for receiving the flow of aqueous emulsion into a first enclosure occupying part of the space within the first compartment, which first enclosure is packed with a first body of high surface area particulate polymeric foam material, said first feed means comprising a fixed upstream foraminous sidewall of said first enclosure;
an opposed fixed downstream foraminous sidewall forming part of the first enclosure through which a flow comprising a non-aqueous phase component and an aqueous phase component can flow into a first separation space for phase separation of said components, said first separation space comprising the remainder of the space within the first compartment;
a first non-aqueous phase recovery means constructed and arranged to recover from the first separation space a non-aqueous flow comprising said non-aqueous phase component; and
a first aqueous phase recovery means constructed and arranged to recover from the first separation space a recovered aqueous flow comprising said aqueous phase component; and
(b) the second compartment includes
a respective feed means for receiving said recovered aqueous flow into a respective enclosure occupying part of the space within the second compartment, which respective enclosure is packed with a respective body of high surface area particulate polymeric foam material, said respective feed means comprising a fixed upstream foraminous sidewall of said respective enclosure;
an opposed fixed downstream foraminous sidewall forming part of the respective enclosure through which a flow comprising a respective non-aqueous phase component and a respective aqueous phase component can flow into a respective separation space for phase separation of said respective components, said respective separation space comprising the remainder of the space within the second compartment;
a respective non-aqueous phase recovery means constructed and arranged to recover from said respective separation space a non-aqueous flow comprising said respective non-aqueous phase component; and
a respective aqueous phase recovery means constructed and arranged to recover from said respective separation space a recovered aqueous flow comprising said respective aqueous phase component.

2. An apparatus according to claim 1 further including between the first and second compartments at least one other compartment which together with the first and second compartments provide a continuous flow path, wherein the at least one other compartment includes:
a further respective feed means for receiving the recovered aqueous flow from an immediately adjacent compartment upstream in the flow path into a further respective enclosure occupying part of the space within said other compartment, which further respective enclosure is packed with a further respective body of high surface area particulate polymeric foam material, said further respective feed means comprising a fixed upstream foraminous sidewall of said further respective enclosure;
an opposed fixed downstream foraminous sidewall forming part of said further respective enclosure through which a flow comprising a further respective non-aqueous phase component and a further respective aqueous phase component can flow into a further respective separation space for phase separation of said further respective components, said further respective separation space comprising the remainder of the space within said other compartment;
a further respective non-aqueous phase recovery means constructed and arranged to recover from the said further respective separation space a non-aqueous flow comprising said further respective non-aqueous phase component; and
a further respective aqueous phase recovery means constructed and arranged to recover from said further respective separation space a recovered aqueous flow comprising said further respective aqueous phase component for delivery to an immediately adjacent compartment downstream in the flow path.

3. An apparatus according to claim 2 wherein, for each compartment other than the first compartment, the feed means for receiving said recovered aqueous flow comprises a common foraminous wall separating said compartment from the immediately upstream compartment.

4. An apparatus according to claim 1 wherein for each enclosure the high surface area particulate polymeric foam material is the same.

5. An apparatus according to claim 2 wherein for each enclosure the high surface area particulate polymeric foam material is the same.

6. An apparatus according to claim 1 wherein the high surface area particulate polymeric foam material for each enclosure is not the same.

7. An apparatus according to claim 2 wherein the high surface area particulate polymeric foam material for each enclosure is not the same.

8. An apparatus according to claim 1 wherein the high surface area particulate polymeric foam material for each enclosure comprises polyurethane.

9. An apparatus according to claim 2 wherein the high surface area particulate polymeric foam material for each enclosure comprises polyurethane.

10. An apparatus according to claim 1 which further includes a pretreatment unit having a feed means for receiving the flow of aqueous emulsion, a pretreatment box and a recovery means for transferring a flow comprising an aqueous phase to the first feed means in the first compartment.

* * * * *